(12) United States Patent
Miyazaki

(10) Patent No.: US 8,234,355 B2
(45) Date of Patent: Jul. 31, 2012

(54) COMMUNICATION DEVICE FOR PATH CONTROL, AND PATH CONTROL METHOD

(75) Inventor: Keiji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 12/767,029

(22) Filed: Apr. 26, 2010

(65) Prior Publication Data

US 2010/0205289 A1   Aug. 12, 2010

Related U.S. Application Data

(63) Continuation of application No. PCT/JP2007/001221, filed on Nov. 7, 2007.

(51) Int. Cl.
*G06F 15/177* (2006.01)
*G06F 12/00* (2006.01)

(52) U.S. Cl. ......................................... 709/220; 709/221

(58) Field of Classification Search .......... 709/220–221, 709/223–225, 238–239, 250
See application file for complete search history.

(56) References Cited

U.S. PATENT DOCUMENTS

| | | | |
|---|---|---|---|
| 5,903,568 A | 5/1999 | Tanaka et al. | |
| 6,151,327 A * | 11/2000 | Sofman et al. | 370/437 |
| 7,359,399 B2 * | 4/2008 | Hirade | 370/441 |
| 2002/0116513 A1* | 8/2002 | Heinonen | 709/230 |
| 2003/0161633 A1 | 8/2003 | Oki et al. | |
| 2003/0169684 A1 | 9/2003 | Yamanaka et al. | |
| 2005/0195864 A1* | 9/2005 | Matsuo et al. | 370/538 |
| 2005/0220030 A1* | 10/2005 | Nagami et al. | 370/241 |
| 2005/0239443 A1* | 10/2005 | Watanabe et al. | 455/414.1 |
| 2006/0245123 A1* | 11/2006 | Yasue | 361/18 |

FOREIGN PATENT DOCUMENTS

| | | |
|---|---|---|
| CA | 2 419 477 | 8/2003 |
| CA | 2 420 842 | 9/2003 |
| EP | 1 341 393 | 9/2003 |
| JP | 9-223090 | 8/1997 |
| JP | 11-252049 | 9/1999 |
| JP | 2003-258908 | 9/2003 |
| JP | 2003-298517 | 10/2003 |

OTHER PUBLICATIONS

International Search Report dated Jan. 29, 2008, from the corresponding International Application.
Takashi Miyamura, et al. "Jisedai Core Network no Gijutsu Tenbo Multi Layer Renkei Kino" NTT Gijutsu Journal, vol. 16, No. 9, Sep. 1, 2004, pp. 13 to 17.
Hideki Yaginuma, et al. "A Study on Multi-layered Network Management Method for GMPLS Network", Technical Report of IEICE, vol. 104, No. 165, Jul. 2, 2004, pp. 19 to 24.

* cited by examiner

*Primary Examiner* — Zarni Maung
(74) *Attorney, Agent, or Firm* — Fujitsu Patent Center

(57) ABSTRACT

Information for performing path control is added to a signaling message used in a network including a higher-level path which accommodates a lower-level path. When a state change occurs in the higher-level path, a communication device extracts using the information a lower-level path to be controlled for the same control item as the control item indicating the state change in the higher-level path. A path to be controlled is selected from among the lower-level paths accommodated in the higher-level path. By controlling the extracted path, a plurality of paths can be easily controlled when there are accommodation relationships among layers.

11 Claims, 22 Drawing Sheets

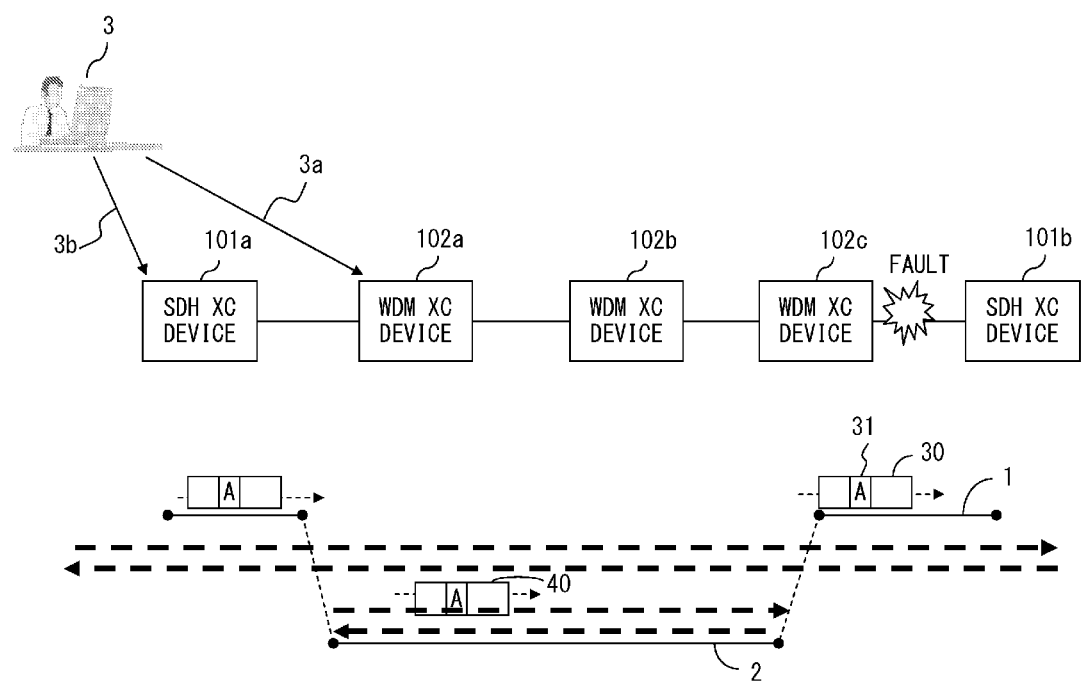
F I G. 1

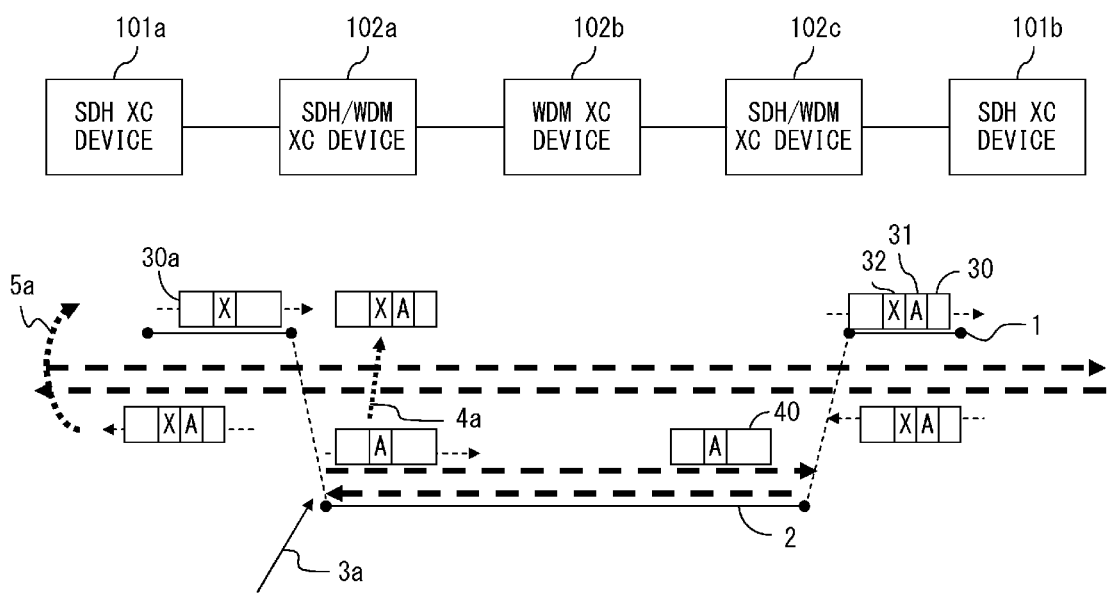
F I G. 2

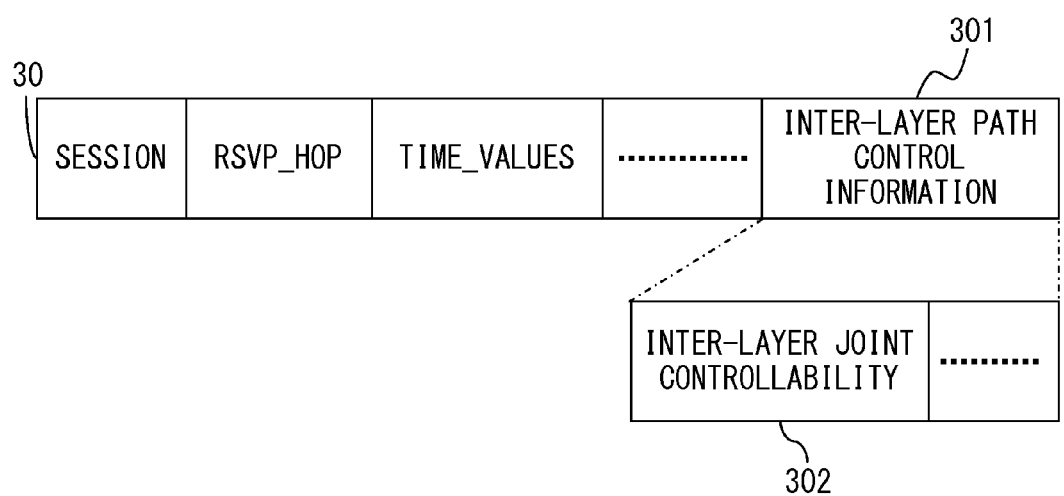
F I G. 3

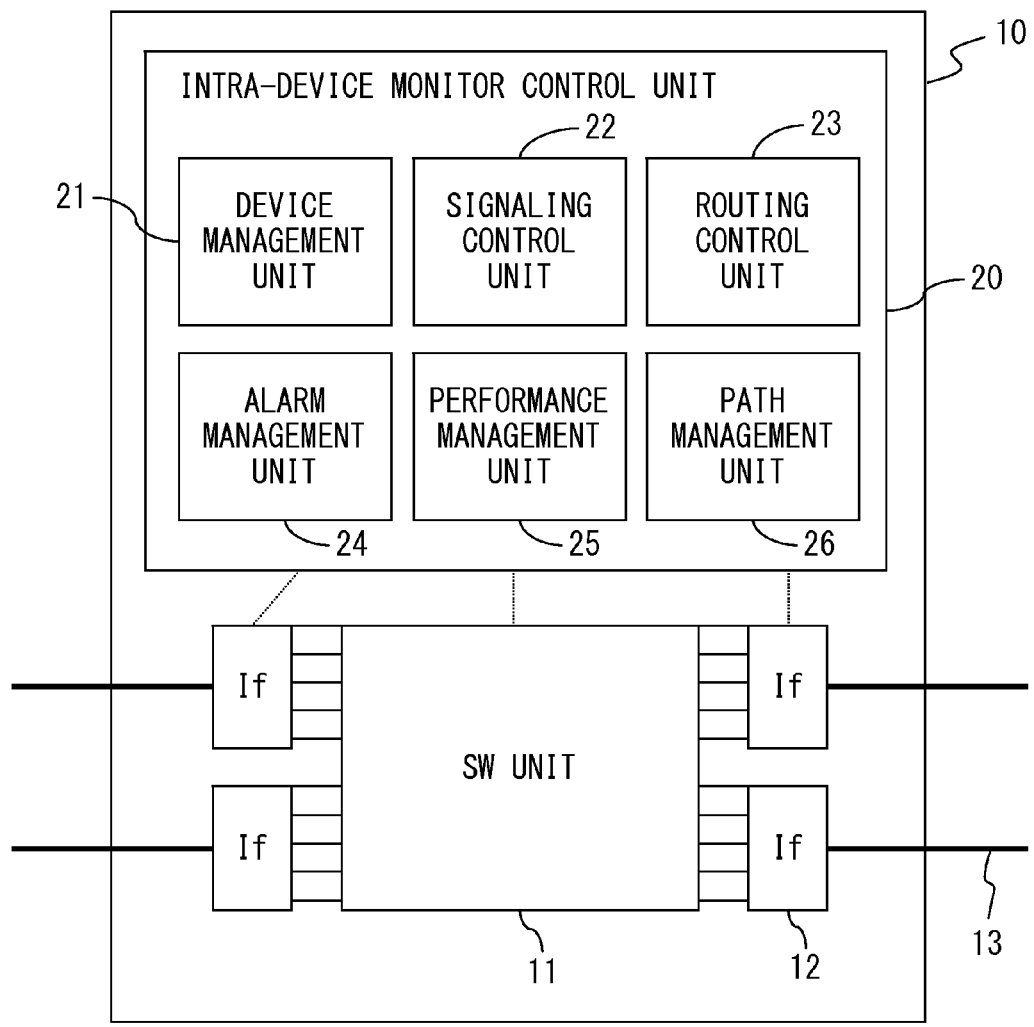
F I G. 5

| PATH ID | STARTING POINT | END POINT | PATH PRIORITY | SERVER PATH ID | PATH STATE | ALARM MASK | INTER-LAYER JOINT CONTROLLABILITY | .. |
|---|---|---|---|---|---|---|---|---|
| 1 | 1-10-1 | 2-3-5 | 1 | 10001 | ACT | NOR | CONTROLLABLE | |
| 2 | 3-5-2 | 10-1-3 | 2 | - | ACT | NOR | UNCONTROLLABLE | |
| 3 | 4-2-6 | 7-2-3 | 1 | 10011 | STBY | INH | CONTROLLABLE | |
| .. | | | | | | | | |

F I G. 6

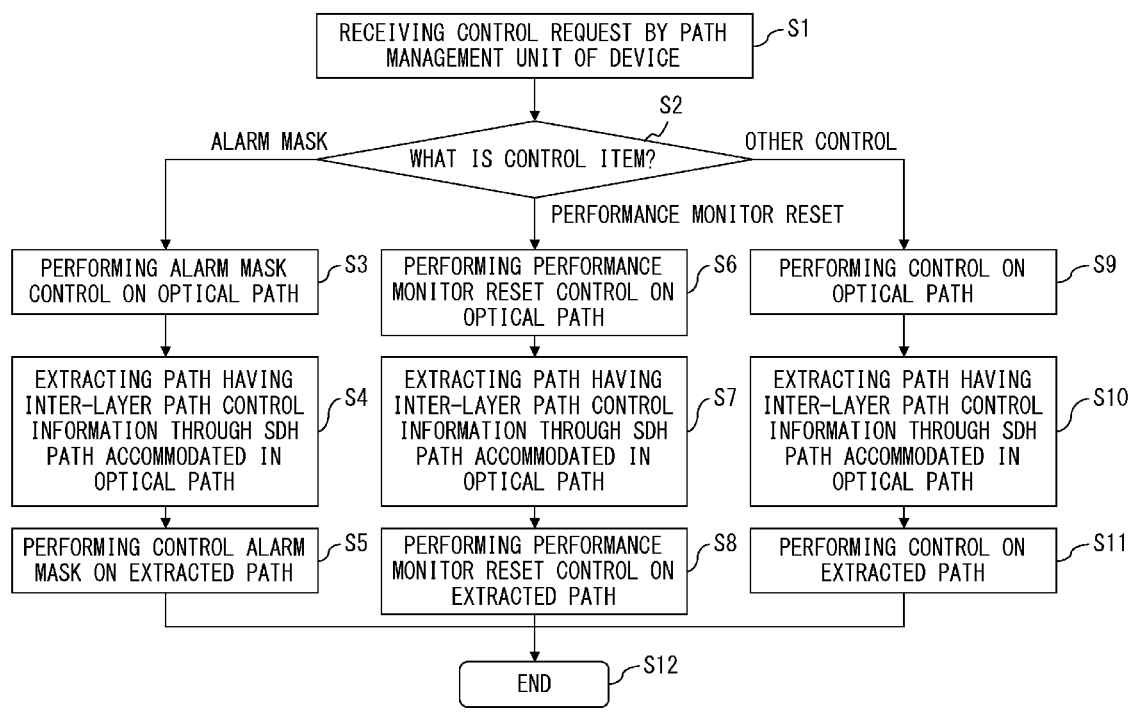
F I G. 7

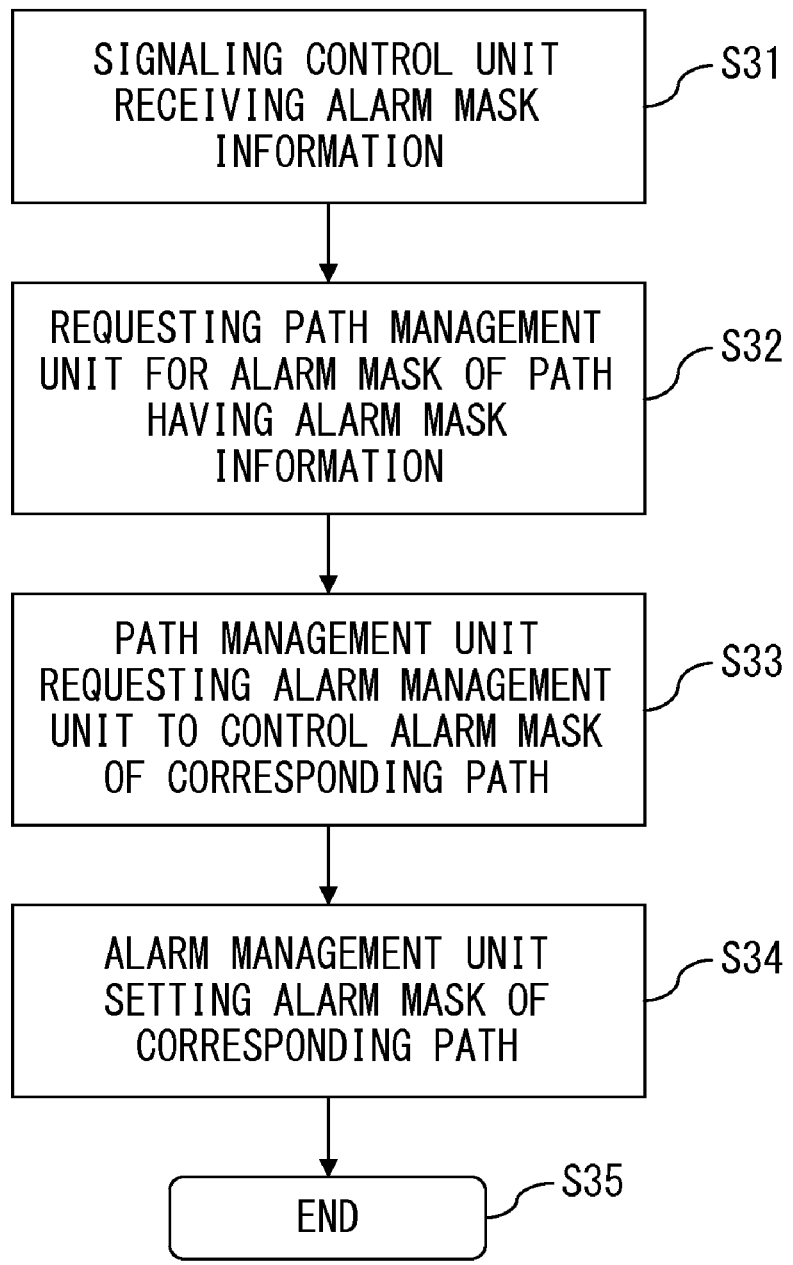
F I G. 9

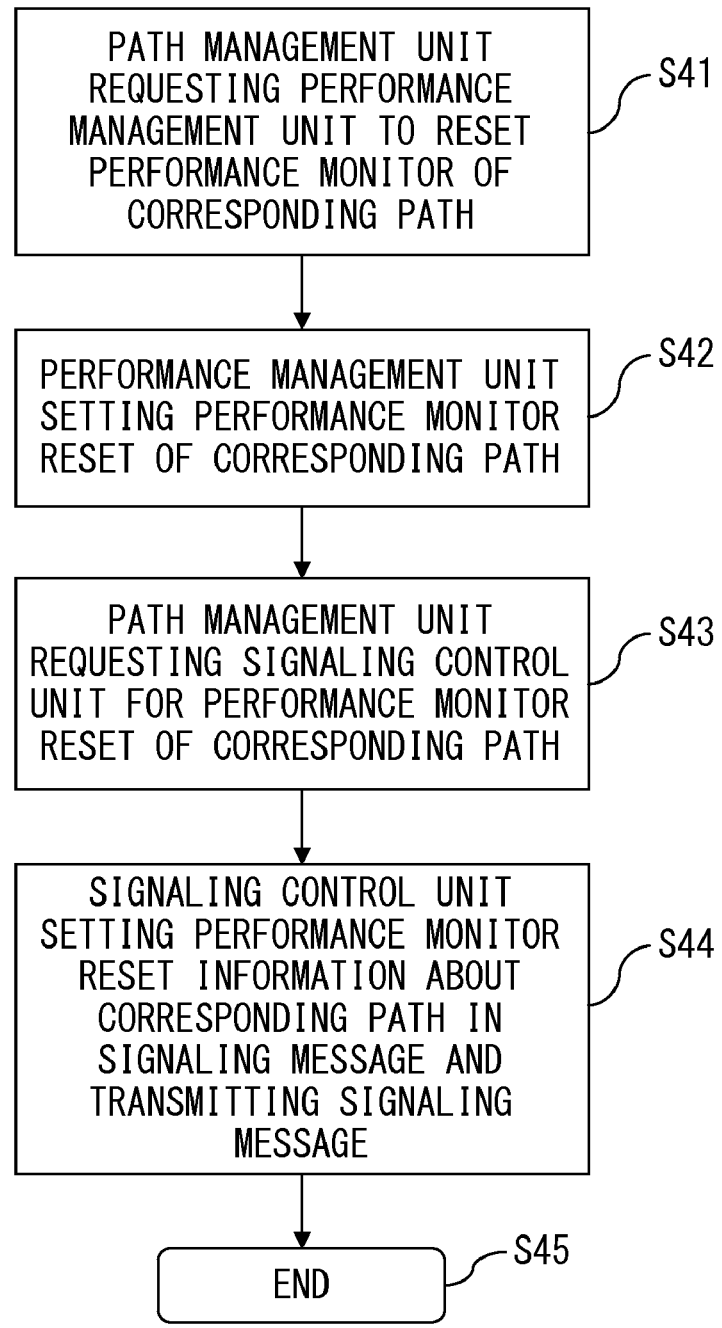
F I G. 1 1

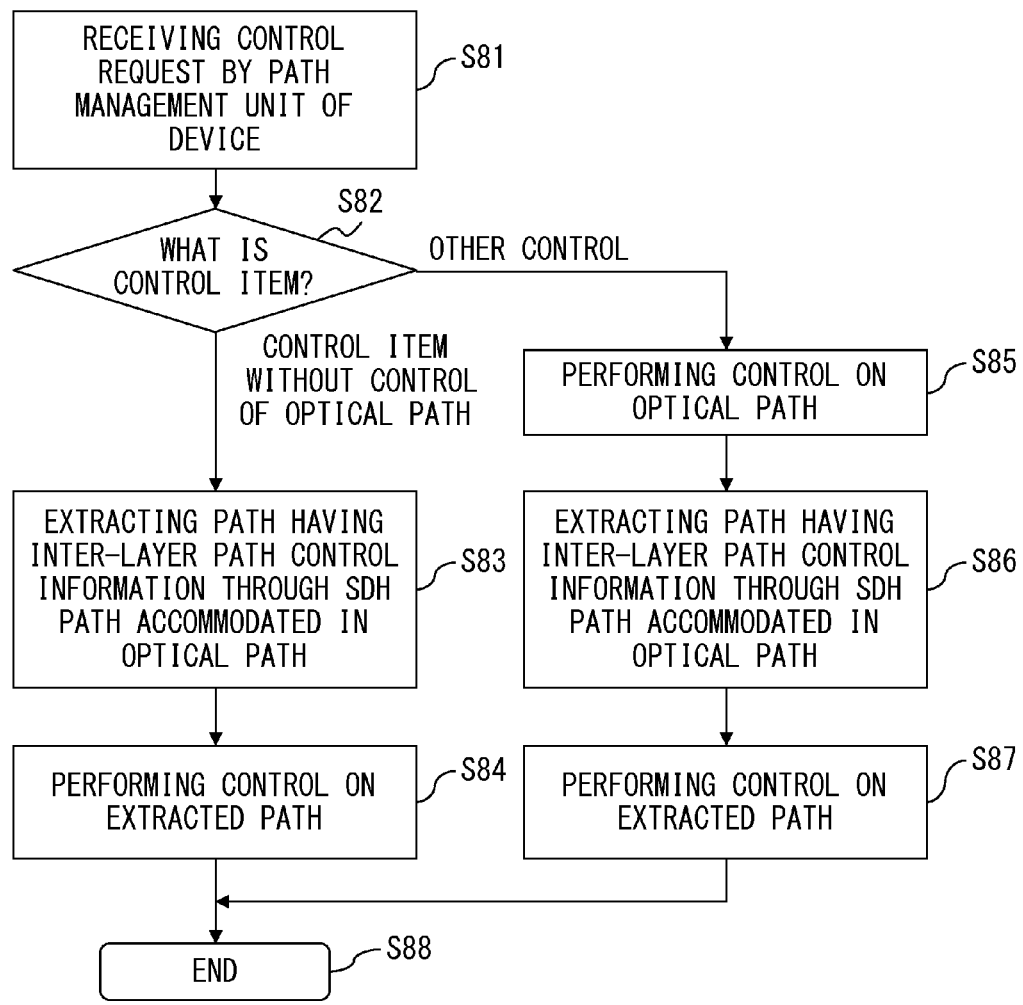
F I G. 1 7

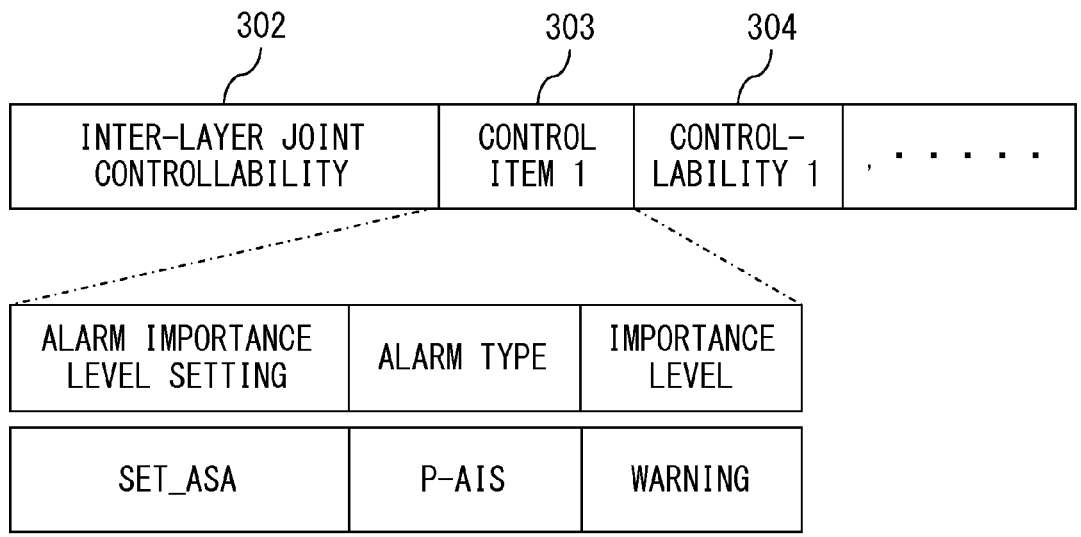
F I G. 19

| PATH ID | ALARM TYPE | IMPORTANCE LEVEL | .. |
|---------|------------|------------------|-----|
| 1 | P-AIS | WARNING | .. |
| 1 | LOS | CRITICAL | .. |
| 10 | P-AIS | MINOR | .. |
| .. | | | |

F I G. 2 1

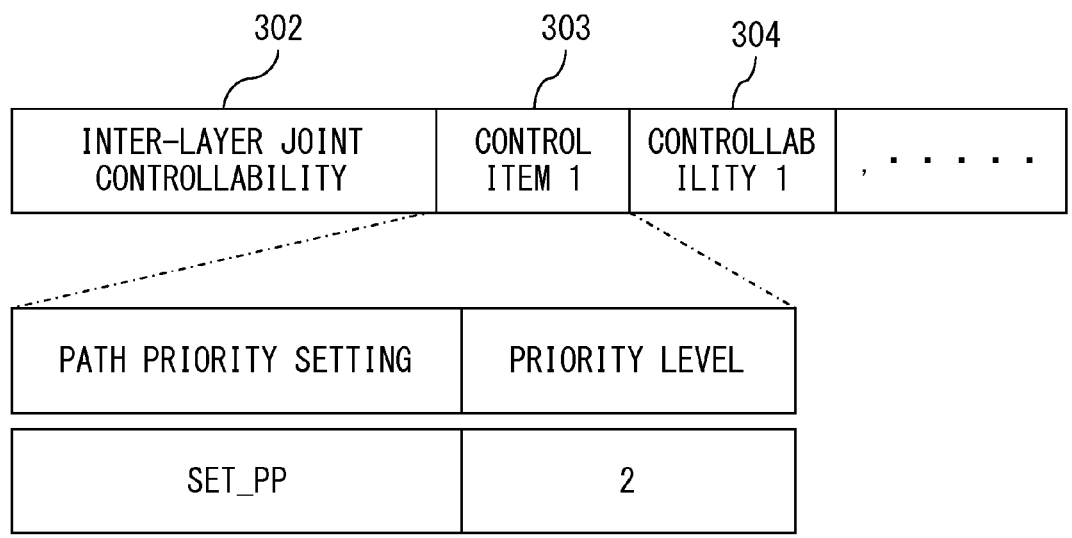
F I G. 2 2

COMMUNICATION DEVICE FOR PATH CONTROL, AND PATH CONTROL METHOD

CROSS-REFERENCE TO RELATED APPLICATION

This application is a continuation of PCT application PCT/JP2007/001221, which was filed on Nov. 7, 2007, and the entire contents of which are incorporated herein by reference.

FIELD

The present invention relates to a path control method using a signaling protocol.

BACKGROUND

Conventionally, by switching the switch of each device using a network management system (NMS) according to a manual operation of an operator in each layer, an end-to-end path is set, and an alarm mask for each path is controlled.

Recently however, a time required to make a path setting can be shortened by a setting from a network management system, a route calculation in each device, and a path setting by signaling. For example, a route calculation is performed in a device using a signaling protocol (RSVP (resource reservation protocol) such as an MPLS (multi-protocol label switching), a GMPLS (generalized multi-protocol label switching), etc., RSVP-TE (resource reservation protocol-traffic engineering) etc., a routing protocol (OSPF (open shortest path first), OSPF-TE (open shortest path first for traffic engineering), etc.). On the basis of the route calculation, the devices included in the route of a path communicate signaling messages among them, thereby checking and implementing a system for setting a path.

On the other hand, the path control after making a path setting is still performed by manual switching for each layer by an operator. The path control is mostly required when a device is transferred due to trouble or is tested in the course of implementing optical fiber, replacing a package, etc. To control an alarm mask etc. of a path, a network management system first checks the accommodation relationship among layers, and then each of the checked paths is to be controlled. However, since there are a large number of lower-level paths accommodated in a higher-level path, a long time is taken to control the paths, and undesired alarms are frequently raised. For example, since a path OC-192 can accommodate 192 paths STS-1, the lower-level paths are to be controlled 192 times for each path OC-192. Furthermore, when 100 wavelengths are multiplexed on one optical fiber using wavelength division multiplexing (WDM), nearly 20 thousands of paths may be controlled.

Although performing path control on a number of paths is laborious work, a fault notification cannot be issued when a fault occurs if control is preliminarily performed by alarm mask etc. on all higher-level paths and lower-level paths in older to take into account a transfer due to trouble and a test.

FIG. 1 is an example of the state in which a fault occurs after an alarm mask is applied in advance to all higher-level paths and lower-level paths. An electric path 1 is set between two synchronous digital hierarchical (SDH) cross-connect devices 101a and 101b illustrated in FIG. 1, and an optical path 2 is set between cross-connect devices 102a and 102c. The electric path 1 is accommodated in the optical path 2.

(1) An operator 3 performs alarm suppression on the optical path 2 with respect to the WDM cross-connect device 102a (3a in FIG. 1). Then, a signaling message 40 in which an alarm suppression bit 31 is set to alarm suppression (A=1) passes through the optical path 2. By the signaling message 40, an alarm for the optical path 2 is suppressed in each of the WDM cross-connect devices 102 (102a, 102b, and 102c).

(2) When the operator 3 performs the alarm suppression on the electric path 1 with respect to the SDH cross-connect device 101a (3b in FIG. 1), the signaling message 30 in which the alarm suppression bit 31 is set to alarm suppression (A=1) passes through the electric path 1 as with the optical path 2. By the signaling message 30 passing through the electric path 1, an alarm on the electric path 1 is suppressed in the SDH cross-connect devices 101 (101a and 101b). The operator 3 controls the alarm suppression on each of the 192 electric paths 1 accommodated in optical path 2.

(3) When the alarm suppression is set on all WDM cross-connect devices 102 and SDH cross-connect devices 101 (A=1), any of the devices does not raise an alarm although a fault occurs between the devices 102c and 101b, thereby failing in detecting the fault.

As a related art of the method for removing an unnecessary alarm, Japanese Laid-open Patent Publication No. 11-252049 discloses the method for removing an unnecessary alarm by changing the number of multiplexed wavelengths when a fault, e.g., optical input disconnection, occurs in an optical fiber.

SUMMARY

According to an aspect of an embodiment of the invention, a communication device configuring a network including a higher-level path which accommodates a lower-level path includes a path control unit specifying a lower-level path accommodated in the higher-level path and set by a signaling message including controllability information indicating "controllable" as a lower-level path to be controlled when the higher-level path or a signaling message of the higher-level path indicates a state change by confirming the controllability information indicating whether or not it is controllable when the higher-level path or the signaling message setting the higher-level path indicates the state change; a signaling control unit setting path control information about a control item corresponding to the state change for the signaling message used in the lower-level path to be controlled and specified by the path control unit; and a control item control unit for controlling the control item.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates the state in which a fault occurs after an alarm mask is applied in advance to all of a higher-level path and lower-level paths;

FIG. 2 exemplifies the outline of the path control using the path accommodation relationship among layers with reference to a case in which an alarm mask is applied;

FIG. 3 is an example of a configuration of a signaling message when an RSVP-TE is used;

FIG. 5 is a configuration of a device used in an embodiment of the present invention;

FIG. 6 is an example of a path database;

FIG. 7 is a flowchart for explanation of an embodiment of control using a path accommodation relationship among layers when a control request is issued from an NMS to a cross-connect device configuring an optical path;

FIG. 9 is a flowchart of the operation of the device which receives a signaling message in which alarm mask information is set when an alarm masking process is performed;

FIG. 11 illustrates an operation of a device for setting a signaling message when a performance monitor reset control process is performed;

FIG. 17 is an explanatory flowchart of the flow of control of an electric path when an optical path is controlled and when an optical path is not controlled;

FIG. 19 is an example of a signaling message in which an alarm importance level is set;

FIG. 21 is an example of a path alarm database; and

FIG. 22 is an example of a configuration of a signaling message when a path priority is set.

DESCRIPTION OF EMBODIMENTS

Figure 4:
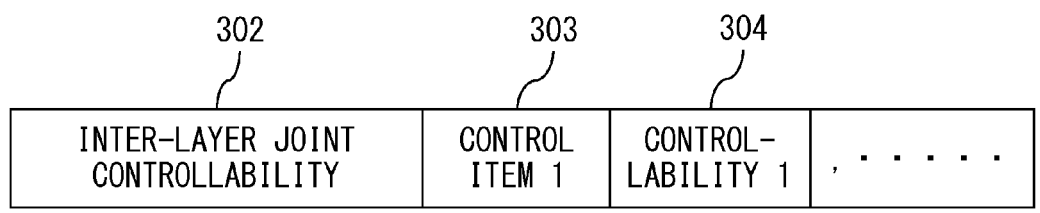
FIG. 4 is an example of a configuration of inter-layer path control information.

The embodiments of the present invention are described below in detail with reference to the attached drawings.
<Outline of Path Control>

In an embodiment of the present invention, lower-level paths are autonomously controlled when a cross-connect device configuring a higher-level path accommodating lower-level paths detects a state change of the higher-level path. A state change of a higher-level path detected by the cross-connect device can be, but is not limited to:

(a) a state change by the control of a higher-level path performed when the cross-connect device receives a control request from an NMS etc.

(b) a state change of a higher-level path that occurs due to an abnormal condition in a network such as a transmission path etc.

In addition, it can also be a configuration wherein the lower-level paths are autonomously controlled when the state of a signaling message of the higher-level path accommodating the lower-level paths is changed. In this case, the cross-connect device controls the lower-level paths when the signaling message of the higher-level path is changed, for example by the cross-connect device which has received a control request from a NMS.

That is, while the higher-level path and the lower-level paths have conventionally been controlled separately, the device configuring a higher-level path extracts a lower-level path to be autonomously controlled and controls the extracted lower-level path by the device detecting a change. That is, by changing a higher-level path or a signaling message for setting a higher-level path, a device which has detected the change autonomously controls the path of a different layer. An item of control performed on a lower-level path is determined by a state change of a higher-level path or a signaling message for setting the higher-level path. For example, a control item in which a state change has occurred by a control request to a higher-level path is a control item of a lower-level path. When a state change caused by a fault in a higher-level path is a trigger, the state change raises an alarm. Since the state relating to the raise of an alarm is changed, the device autonomously controls the alarm suppression or a change of the raising condition of an alarm of an alarm importance level etc. on a lower-level path.

Described below as a practical example is a case in which a lower-level path is the electric path 1, and the higher-level path is the optical path 2.

FIG. 2 exemplifies the outline of the control using the path accommodation relationship among layers with reference to a case in which an alarm mask is performed according to a control request from an NMS. The electric path 1 is set between the cross-connect devices 101*a* and 101*b*, and the optical path 2 is set among the cross-connect devices 102*a*, 102*b*, and 102*c*. The electric path 1 is accommodated in the optical path 2. The path is controlled as follows. In the following explanation, the path starting point is set on the left side in FIG. 2. The "cross-connect device existing at the starting point of the path" may also be referred to as a "starting device (or device at the starting point)", and the "cross-connect device existing at the end point of the path" may also be referred to as an "endpoint side device (or device at the endpoint side)".

(1) A control joint flag 32 is set for the electric path 1 on which the same type of control is performed when the optical path 2 is controlled. The setting is performed by:

(a) transmitting a signaling message in which the control joint flag 32 is set to (X=1) from the cross-connect device at the starting point of the path to the endpoint side device; and (b) then transferring a signaling message from the starting point device to the endpoint side device.

Each device configuring the electric path 1 recognizes that the electric path 1 which receives a signaling message in which the control joint flag 32 is set to "X=1" can be controlled when the optical path 2 is controlled. The transmission of a signaling message for setting the control joint flag 32 may be performed when a path is generated, or before a higher-level path is controlled. The practical structure of the signaling message is described later.

(2) The operator 3 sets the suppression of an optical path alarm for the starting point device 102*a* of the optical path 2 via an NMS (3*a* in FIG. 2). By the setting, the starting point device 102*a* transmits the signaling message 40 for an optical path whose alarm suppression bit 31 is set to alarm suppression (A=1) to the endpoint side device 102*b*. The starting point device 102*a* sets alarm suppression for the optical path 2 operated from the NMS. For the optical path 2, each device configuring the optical path 2 is set to the alarm suppression of the optical path 2 by the signaling message 40 of an optical path. That is, in the devices 102a, 102b, and 102c, the alarm suppression bit 31 is set to A=1.

(3) The device 102a which is the starting point device of the optical path 2 extract the electric path 1 which is accommodated in the controlled optical path 2 and whose control joint flag 32 is set. For the extracted electric path 1, the alarm suppression of the device 102a is set (4a in FIG. 2). Furthermore, the signaling message 30 for setting the alarm suppression is transmitted to the extracted electric path 1. In the signaling message 30 of the electric path 1 which performs the same type of control when the optical path 2 is controlled, the control joint flag 32 has been set to X=1 by the operation of (1) above. Then, the alarm suppression bit 31 of the existing signaling message 30 is set to alarm suppression (A=1), and the message is transmitted to the endpoint side of the electric path 1.

(4) In the optical path 2, the signaling message 30 for an electric path is not used in setting a device, and the signaling message 30 passes from the starting point device 102a of the optical path 2 to the device 102c as the endpoint device of the optical path 2. Upon receipt of the signaling message 30, the endpoint device 102c of the optical path 2 sets the electric path Ito alarm suppression, and transmits the signaling message 30 to the device 101b.

(5) When the device 101b which is the endpoint device of the electric path 1 receives the signaling message 30, the cross-connect device 101b sets the electric path 1 that has received the signaling message 30 to alarm suppression for the device 101b, and transmits the signaling message 30 to the starting point side of the electric path 1.

(6) The signaling message 30 received from the endpoint side of the electric path 1 passes through the optical path 2, and transferred to the starting point side of the electric path 1. When the device 102a which is the starting point device of the optical path 2 receives the signaling message 30, the signaling message 30 is transmitted to the starting point device 101a of the electric path 1.

(7) The device 101a which is the starting point device of the electric path 1 receives from the endpoint side of the electric path 1 the signaling message 30 which is different from the signaling message 30a which has been transmitted by the device 101a and whose the alarm suppression bit 31 is set to alarm suppression. Then it recognizes whether the change of the signaling message is a change by a failure of signaling or a change in controlling the optical path 2. If the control joint flag 32 of the signaling message is X=1, it recognizes that the change has been made in controlling the optical path 2. A path management unit 26 may be configured to determine whether or not a change has been made by a fault of the optical path 2.

(8) If the signaling message has been changed in controlling the optical path 2, and when the device is positioned between the starting point of the electric path 1 and the starting point of the optical path 2, then the alarm suppression of the electric path 1 is not set in the device. Thus, the starting point device 101a of the electric path 1 sets the alarm suppression bit 31 of the signaling message to alarm suppression (5a in FIG. 2), and transmits the message to the endpoint side device. In addition, the starting point device 101a of the electric path 1 sets the alarm suppression of the electric path 1 (A=1).

For comprehensibility, one electric path is illustrated in this example, but normally one optical path can accommodate a number of electric paths as described above. Furthermore, control is not necessarily performed on all accommodated electric paths.

<Configuration of Signaling Message>

FIG. 3 is an example of a configuration of the signaling message 30 when an RSVP-TE is used. As with a normal RSVP-TE signaling message, a signaling message includes an inter-layer path control information 301 so that the electric path 1 can also be controlled in controlling the optical path 2. As illustrated in FIG. 4, the inter-layer path control information 301 further includes inter-layer joint controllability information 302, control item information 303, controllability information 304, etc. In the present specification, the terms "path control information" or "lower-level path control information" can be used as a term indicating the inter-layer path control information 301.

The inter-layer joint controllability information 302 is controllability information indicating the controllability of an accommodated lower-level path according to a state change that has occur in the higher-level path or a signaling message which sets the higher-level path when a higher-level path accommodates lower-level paths. For example, as with the optical path 2 and the electric path 1, when there are a plurality of configuration units of paths to be conventionally controlled separately, the information indicates whether or not the electric path 1 is controlled using the accommodation relationship with the optical path 2. That is, the inter-layer joint controllability information 302 is set in the signaling message of the electric path 1 to be controlled when the optical path 2 is controlled and of the electric path 1 to be controlled when a fault is detected in the optical path 2. Furthermore, as described later, the inter-layer joint controllability information 302 is used when a plurality of electric paths 1 are simultaneously controlled using the accommodation relationship of the optical path 2 although the optical path 2 itself is not controlled.

That is, it is also considered that the inter-layer joint controllability information 302 also refers to the controllability about the same type of control item as the lower-level path to be controlled for other lower-level paths accommodated in a higher-level path when one lower-level path accommodated in the higher-level path is controlled.

As described above, depending on the setting of the control joint flag 32, it is not recognized as a failure of signaling although the control information is different between the 30a transmitted by the starting point device of the electric path 1 and the signaling message 30 received by the starting point device from the endpoint side of the electric path 1. That is, the inter-layer joint controllability information 302 can also be used as the information for permission of a change of the signaling message 30 in a device other than the starting point device of the electric path 1. The format of the inter-layer joint controllability information 302 is optional, and the control joint flag 32 (X) illustrated in FIG. 2 is an example.

The control item information 303 is information for designation of the control contents by the signaling message 30. A control item can be alarm mask control, performance monitor reset control, alarm importance level setting, path priority setting, etc., but is not limited to them.

The controllability information 304 is information for determination as to whether or not the cross-connect device which receives the signaling message 30 can perform the control designated by the control item information 303. Therefore, the controllability information 304 can be recorded as a pair to the control item information 303. Therefore, in the signaling message 30 having the controllability information 304, control can only be performed for the control item information of the control item information 303 described in the signaling message 30 that has been indicated as "controllable" by the controllability information 304. For example, when alarm suppression is set as a control item in the signaling message 30 and the controllability information 304 is set to "controllable", the alarm suppression control of the cross-connect device is performed according to the signaling message 30.

In addition, the signaling message 30 can include one or more pieces of control item information 303 and/or controllability information 304. In this case, control can be performed for the number of times equal to the number of pieces of the control item information 303 containing the controllability information 304 as "controllable". For example, if the signaling message 30 has the settings of:

Alarm suppression control: controllable
Performance monitor reset control: controllable
Alarm importance level control: uncontrollable
Path priority control: uncontrollable, the alarm suppression can be performed and the performance monitor reset (clearing the performance information etc.) can be performed, but setting an alarm importance level or controlling a path priority cannot be performed.

The control item information 303 and the controllability information 304 are not necessarily set separately. For example, the state in which the alarm suppression bit 31 is set to "A=1" as illustrated in FIG. 2 corresponds to the setting of the control item "alarm suppression" as "controllable".

FIG. 5 is a configuration of a cross-connect device 10 used in an embodiment of the present invention. The cross-connect device 10 is provided with a switch unit 11, an interface unit 12, a line 13, and an intra-device monitor control unit 20. The intra-device monitor control unit 20 is provided with a device management unit 21, a signaling control unit 22, a routing control unit 23, an alarm management unit 24, a performance management unit 25, and a path management unit 26. However, according to an embodiment, the intra-device monitor control unit 20 may be changed; for example, the intra-device monitor control unit 20 may not include the performance management unit 25. The signaling control unit 22, the alarm management unit 24, the performance management unit 25, and the path management unit 26 can also be collectively referred to as "control item control units".

The cross-connect device 10 includes an SDH cross-connect device (101a etc.), an SDH/WDM cross-connect device (102a etc.), and a WDM cross-connect device (102b). Although the configurations of the switch unit 11, the interface unit 12, and the line 13 are variable depending on the type of the cross-connect device, the structure of the intra-device monitor control unit 20 may essentially be the same.

The switch unit 11 is used in setting a path, and an end-to-end path is set by changing the setting of the switch unit 11. The interface unit 12 connects the switch unit 11 to other cross-connect devices.

The device management unit 21 performs the entire control of the cross-connect device itself in the cross-connect device 10.

The signaling control unit 22 controls the signaling message received or transmitted by the device. For example, when the contents of the signaling message 30 are changed as necessary, the signaling control unit 22 changes them. In addition, if it is confirmed whether or not the signaling message can be changed in any device of the electric path 1 by confirming the setting of the signaling message in the starting point device of the electric path 1, then the signaling control unit 22 will include a signaling message change permission confirmation unit.

The intra-device monitor control unit 20 also includes a routing control unit 23 for controlling a routing function.

The alarm management unit 24 monitors a transmission line fault etc., controls issuing and suppressing an alarm, and sets and changes an alarm importance level. In the present specification, the alarm management unit 24 includes an alarm suppression control unit for suppressing an alarm and an alarm importance level control unit for setting and changing an alarm importance level.

The performance management unit 25 controls performance information such as recording, changing, updating, clearing, etc. of performance information.

The path management unit 26 includes a path database as illustrated in FIG. 6, and controls the state of a path. The path database also records, as the data indicating the state of a path information of whether or not the electric path 1 should be controlled when the optical path 2 is controlled. For example, if the control joint flag 32 of the signaling message 30 is set to "X=1" in an electric path 1, the information that the electric path 1 corresponds to a "lower-level path to be controlled" is recorded in the path database. Any method of recording that the electric path 1 corresponds to a "lower-level path to be controlled" can be used. For example in FIG. 6, it is recorded by setting the item of "controllability of inter-layer joint control" as "controllable". Using the information about a "lower-level path to be controlled", the path management unit 26 recognizes which electric path 1 is to be controlled when the optical path 2 is controlled. Furthermore, when it is confirmed whether or not a signaling message can be changed in an optional device in the electric path 1 by confirming the path database in a starting point device of the electric path 1, the path management unit 26 includes a signaling message change permission confirmation unit. The signaling message change permission confirmation unit determines as described above that a signaling message can be changed in an optional device for a lower-level path to be controlled. In addition, for example, when the contents of the signaling message 30 is alarm suppression, the path management unit 26 allocates an operation to each control portion by requesting the alarm management unit 24 to perform alarm suppression etc.

<Embodiment for Controlling an Optical Path and an Electric Path According to a Control Request>

An embodiment in which a control item requested by a control request is also controlled in the optical path 2 is described below. FIG. 7 is a flowchart for explanation of an embodiment of control using a path accommodation relationship among layers when a control request from an NMS is issued to a cross-connect device configuring a higher-level path (optical path 2). For example, in the example illustrated in FIG. 2, the WDM cross-connect device 102a performs an operation illustrated in FIG. 7.

First, when a control request is transmitted to a cross-connect device, the path management unit 26 of the device receives the control request, and recognizes what the control item is (steps S1 and S2). The control item requested by the control request is also to be controlled in the optical path 2. Thus, for example, when an alarm masking process is requested, the path management unit 26 requests the alarm management unit 24 to perform the alarm masking process on the optical path 2, and the alarm management unit 24 performs the alarm masking process (step S3).

Next, when the optical path 2 is controlled, the path management unit 26 extracts an electric path 1 to be controlled from among the electric paths 1 accommodated in the optical path 2 (step S4). The electric path 1 accommodated in the optical path 2 is extracted using a path database. The path ID in FIG. 6 is an identifier assigned to the electric path 1. A server path ID is an identifier assigned to the optical path 2 as a higher-level path. Upon receipt of a control request for the optical path 2, the path management unit 26 confirms in the column of the server path ID the identifier of the optical path 2 requested by the control request, and recognizes as an accommodated lower-level path the electric path 1 whose corresponding identifier is recorded in the server path. For example, it is recognized that the optical path 2 having the identifier of "10001" accommodates the electric path 1 having the path ID of "1".

Furthermore, the path management unit 26 checks whether or not the electric path 1 recognized as the lower-level path of the optical path 2 is an electric path to be controlled when the optical path 2 is controlled. As described above, it is determined whether or not the path is to be controlled with reference to the information in the path database. In the present specification and the attached drawings, the extracted electric path 1 may also be referred to as a "lower-level path to be controlled", an "electric path to be controlled", or a "corresponding path".

After extracting the electric path 1, the path management unit 26 requests the alarm management unit 24 to perform the alarm masking process on the electric path 1, and the alarm management unit 24 performs the alarm masking process (step S5).

The same process is performed when a request for the performance monitor reset is recognized in step S2. First, the path management unit 26 requests the performance management unit 25 to reset performance information about the optical path 2, and the performance management unit 25 resets the performance information (step S6). Next, the path management unit 26 extracts a lower-level path to be controlled as in step S4 (step S7). When the performance management unit 25 receives from the path management unit 26 the request to reset the performance information about the extracted lower-level path to be controlled, it resets the performance information (step S8).

When other control is requested, control is performed on the optical path 2, and after the path management unit 26 extracts the lower-level path to be controlled (steps S9 and S10), the path management unit 26 requests a predetermined portion for control, and the requested portion performs control (step S11).

{Embodiment of Alarm Masking Process}

Figure 8:
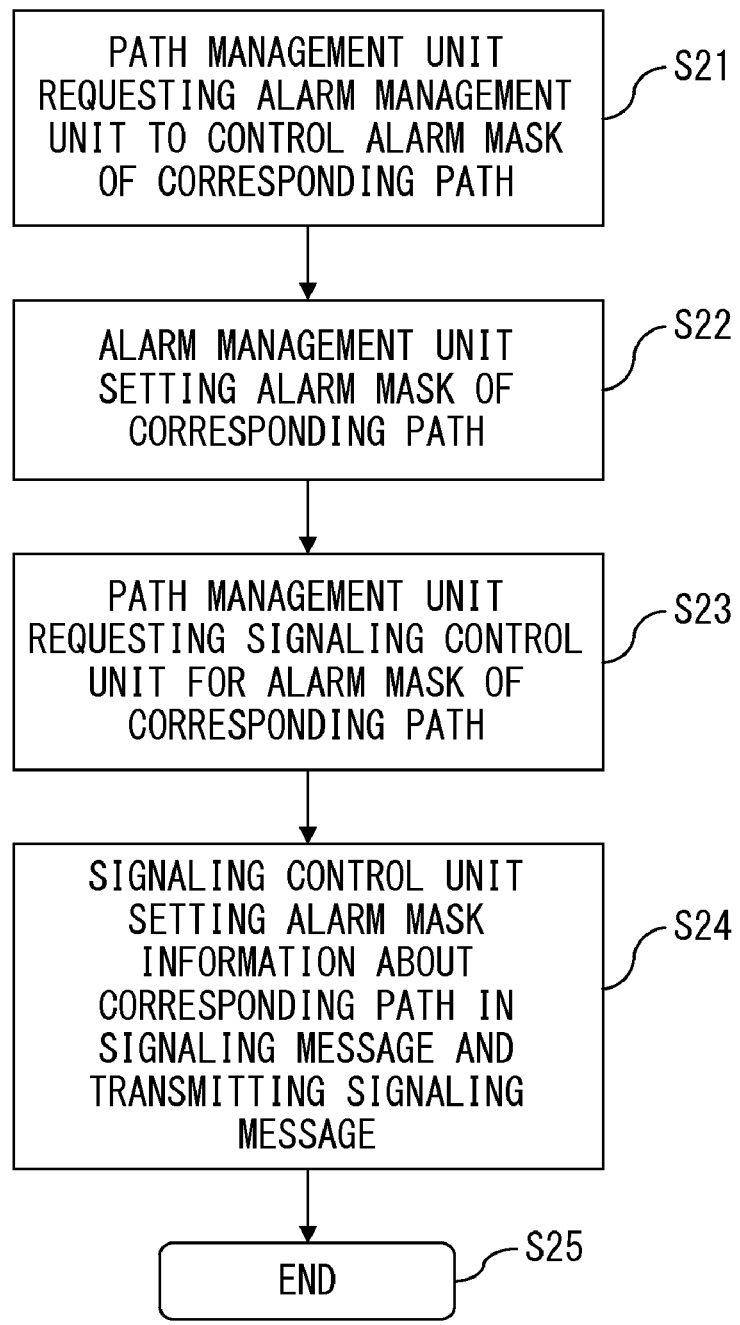
FIG. 8 is a flowchart of the operation of a device for setting a signaling message when an alarm masking process is performed.

The alarm masking process is described below in detail. As described above, when the optical path 2 as a higher-level path is controlled in a device, the device sets the signaling message 30. FIG. 8 is a flowchart of the operation of the device which sets the signaling message 30 when the alarm masking process is performed. FIG. 9 is a flowchart of the operation of the device which receives the signaling message 30 of alarm suppression when the alarm masking process is performed.

As with the device 102a in FIG. 2, when a cross-connect device is controlled from the optical path 2, the device extracts the electric path 1 to be controlled. The extracting method is described above. To control the extracted electric path 1, the path management unit 26 requests the alarm management unit 24 to control an alarm mask (step S21). The alarm management unit 24 performs alarm mask control on the path requested by the path management unit 26 (step S22). The path management unit 26 requests the signaling control unit 22 to change the signaling message 30 for notifying another cross-connect device of the performance of the alarm mask on the extracted electric path 1 (step S23). The signaling control unit 22 sets alarm mask information in the signaling message 30 in response to the request from the path management unit 26 (step S24).

In the cross-connect device which receives the signaling message 30 that has set alarm mask information, the signaling control unit 22 receives alarm mask information (step S31). The signaling control unit 22 requests the path management unit 26 to control an alarm mask of the path which has received the alarm mask information (step S32). Upon receipt of the request, the path management unit 26 requests the alarm management unit 24 to control an alarm mask, and the alarm management unit 24 controls the alarm mask for the requested path (steps S33 and S34).

As described above, an alarm mask can be autonomously controlled on the electric path 1 which is accommodated in the optical path 2 and needs to be controlled for an alarm mask when the optical path 2 is controlled for the alarm mask by an operator controlling the alarm mask on the optical path 2 only once. Therefore, the load of the operator required when an alarm masking process is required, for example, in providing fiber, replacing a package, or the like, can be reduced. An unnecessary issue of an alarm by an operation error can also be suppressed.

{Embodiment of Performance Monitor Reset Control Process}

Figure 10:
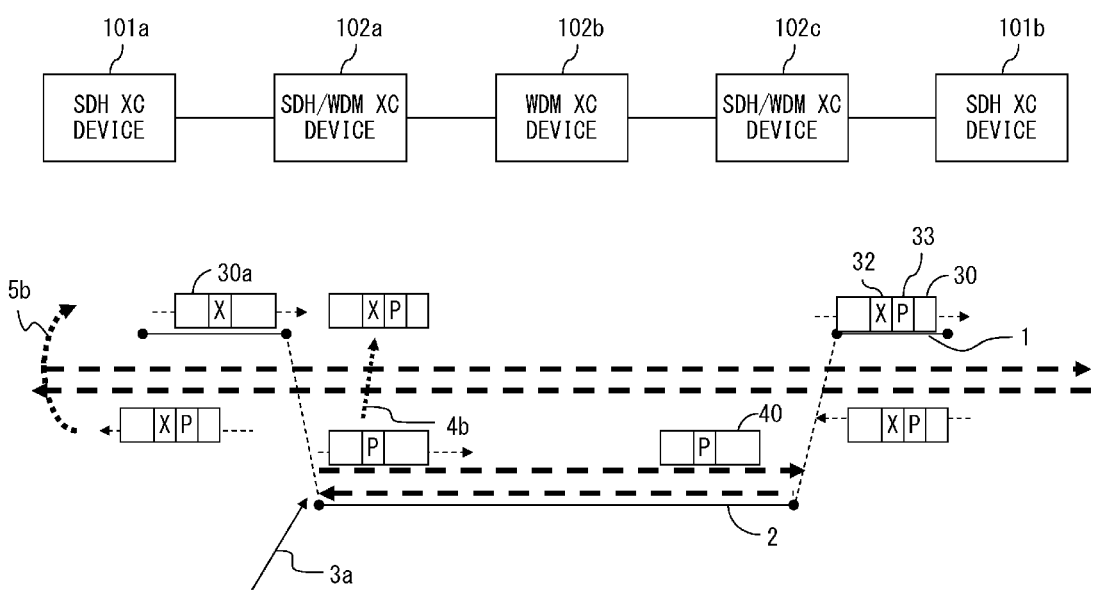
FIG. 10 illustrates an embodiment of performing performance monitor reset control.
Figure 12:
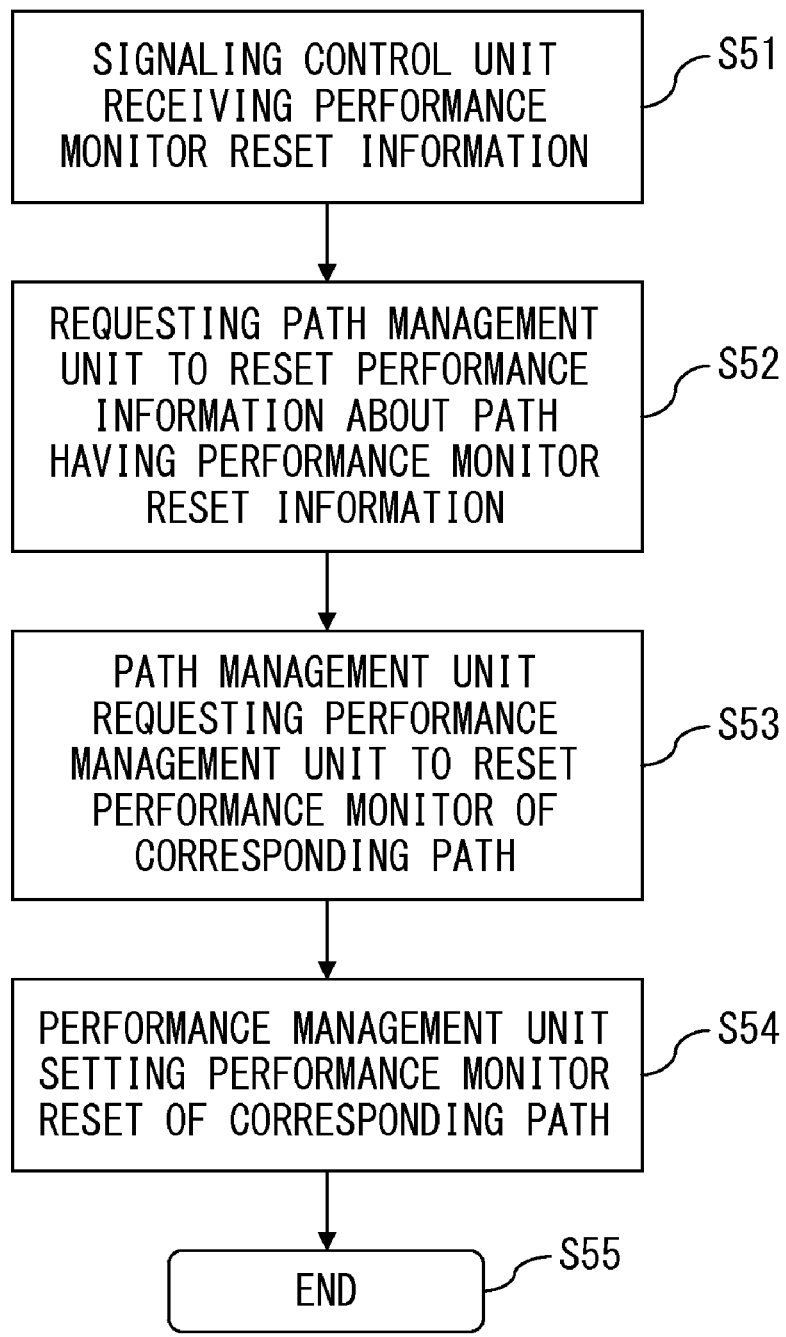
FIG. 12 illustrates an operation of a device which receives a signaling message in which performance monitor reset information is set.

FIG. 10 illustrates an embodiment of controlling performance monitor reset. The performance monitor reset control process is performed when it becomes necessary to clear the performance information about the electric path 1 by a fault caused in the optical path 2 as a higher-level path. FIG. 11 illustrates an operation of the device for setting the signaling message 30 when the performance monitor reset control process is performed, and an operation performed in the procedure (3) in the explanation with reference to FIG. 10. FIG. 12 illustrates an operation of the device which receives the signaling message 30 in which the performance monitor reset information is set, and an operation performed in the procedure (5) in the explanation with reference to FIG. 10.

The process illustrated in FIG. 10 is described below with reference to FIGS. 11 and 12. The procedure (1) illustrated in FIG. 10 is the same as the procedure (1) explained above with reference to FIG. 2.

(2) When the operator 3 requests the starting point device 102a of the optical path 2 to reset the optical path performance through the NMS (3a), the starting point device 102a clears the performance information about the optical path 2. The starting point device 102a transmits the signaling message 40 for the optical path with performance monitor reset information 33 to the endpoint side device 102b, thereby clearing the performance information about the optical path 2 in each device configuring the optical path 2.

(3) The starting point device 102a of the optical path 2 extracts the electric path 1 as discussed above to be controlled when the optical path 2 is controlled. The path management unit 26 requests the performance management unit 25 to clear the performance information for the extracted electric path 1 (step S41 in FIG. 11). The performance management unit 25 clears the performance information about the requested path (step S42). The signaling control unit 22 sets the performance monitor reset information 33 in the signaling message 30, and transmits the message to the endpoint side of the electric path 1 according to the request from the path management unit 26 (steps S32 and S44). Step S42 in FIG. 11 corresponds to the process of 4B in FIG. 10.

(4) In the optical path 2, the signaling message 30 for the electric path is not used in setting the device, but the signaling message 30 passes from the starting point device 102a of the optical path 2 to the endpoint device 102c of the optical path 2.

(5) Upon receipt of the signaling message 30 from the device 102*a*, the signaling control unit 22 receives the performance monitor reset information 33 in the endpoint device 102*c* of the optical path 2 (step S51). The signaling control unit 22 requests the path management unit 26 to perform performance monitor reset, and the path management unit 26 transmits the performance monitor reset request to the performance management unit 25 (steps S52 and S53). Upon receipt of the request, the performance management unit 25 clears the performance information about the requested electric path 1 (step S54). In addition, it transmits the signaling message 30 to the endpoint side device of the electric path 1.

The subsequent procedures are the same as the procedures (5) through (8) described above with reference to FIG. 2 except that the process performed by each device is to clear the performance monitor information, and the change point of the signaling message 30 is the performance monitor reset information 33. In addition, the process expressed by 5*b* in FIG. 10 is a setting of the performance monitor reset information 33 in the signaling message 30 in the starting point device of the electric path 1.

When a fault of a path occurs, not only the number of errors increases or decreases, but also the reliability of the error information is degraded. Therefore, it becomes necessary for the cross-connect device itself which has received the error information to determine whether or not the error information is valid, but the endpoint device can necessarily determine the validity of the error information correctly. Thus, when there occurs a fault in the optical path 2, it may be necessary to forcibly clear the error information itself on the electric path 1. In this case, a performance information reset process can be performed using the process according to the present embodiment to easily clear the performance information and further decrease the possibility of an operation error. The performance information may be, for example, an SES (Severely Errored Seconds), an ESS (Errored Seconds—Section), etc., but it is not limited to these examples.

As described above, upon receipt of a control request for the optical path 2, the cross-connect device 10 extracts the electric path 1 which is accommodated in the optical path 2 to be controlled and which is to be controlled when the optical path 2 is controlled. The electric path 1 is extracted using the information in the path database. Furthermore, the same type of control as that performed by the cross-connect device 10 on the optical path 2 is autonomously performed on the extracted electric path 1. Therefore, by the operator 3 retrieving the accommodation relationship through the NMS, it becomes unnecessary to retrieve the electric path 1 to be controlled when the optical path 2 is controlled, and it is also unnecessary to individually control each electric path 1.

<Embodiment of Control Using Path Accommodation Relationship Among Layers when Alarm is Raised>

Figure 13:
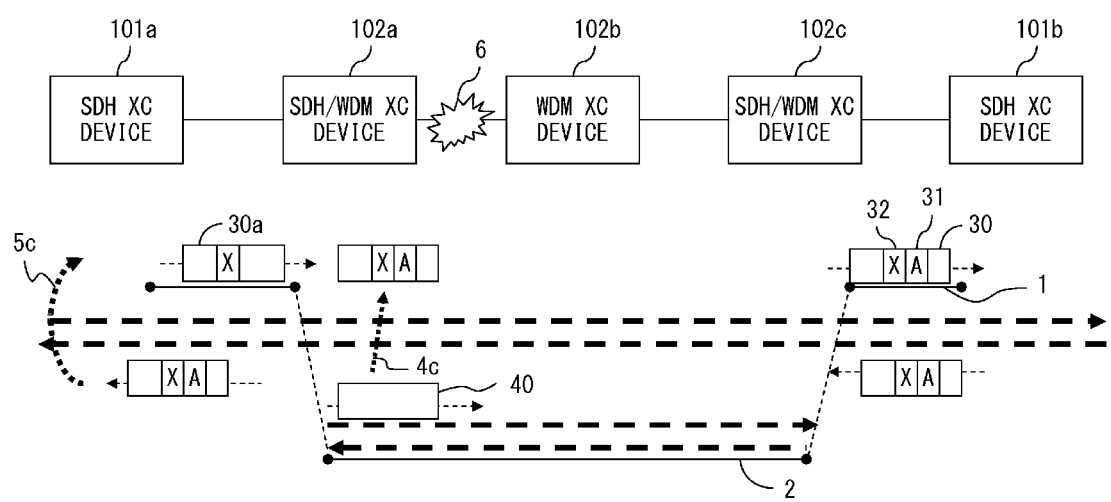
FIG. 13 is an example of an embodiment of control using a path accommodation relationship among layers triggered by an alarm.

FIG. 13 is an example of an embodiment of control which is triggered by an alarm and which uses a path accommodation relationship among layers. The electric path 1 is set between the cross-connect devices 101*a* and 101*b*, and the optical path 2 is set among the cross-connect devices 102*a*, 102*b*, and 102*c*. The electric path 1 is accommodated in the optical path 2. Described below in detail is the case in which alarm suppression control is performed when a fault 6 occurs in the optical path 2 between the devices 102*a* and 102*b*.

(1) Before the fault 6 occurs, the optical path 2 is in a normal state. The signaling message 40 does not include the alarm suppression bit 31 as illustrated in FIG. 13.

(2) The fault 6 occurs in the optical path 2. The fault 6 is detected by the cross-connect device 102*a*.

(3) The cross-connect device 102*a* extracts, the electric path 1 for which the control joint flag 32 is set (e.g., X=1), from among the electric paths 1 accommodated in the optical path 2 in which the fault 6 has occurred, and performs alarm suppression control on the extracted electric path 1 (4*c* in FIG. 13).

(4) The cross-connect device 102*a* assigns the alarm suppression bit 31 (A=1) to the signaling message 30 of the extracted electric path 1, and transmits the signaling message 30 provided with the alarm suppression bit 31 to the endpoint side of the path.

(5) In the optical path 2, the signaling message 30 for an electric path is not used in setting a device, but the signaling message 30 passes from the starting point device 102*a* of the optical path 2 to the endpoint device 102*c* of the optical path 2.

(6) The endpoint device 102*c* of the optical path 2 which has received the signaling message 30 sets alarm suppression for the electric path 1 which has received the signaling message 30, and transmits the signaling message 30 to the endpoint device 101*b* of the electric path 1.

(7) When the cross-connect device 101*b* (i.e., the endpoint device of the electric path 1) receives the signaling message 30, the cross-connect device 101*b* sets alarm suppression for the electric path 1 which has received the signaling message 30, and transmits the signaling message 30 to the starting point side of the electric path 1.

(8) The signaling message 30 received from the endpoint side of the electric path 1 passes through the optical path 2. When the starting point device 102*a* of the optical path 2 receives the signaling message 30, it transfers the message to the starting point side.

(9) The starting point device 101*a* of the electric path 1 receives from the endpoint side of the electric path 1 the signaling message 30 which is different from the signaling message 30*a* that has been transmitted from the device 101*a*, but whose alarm suppression bit 31 is set to alarm suppression. Then, it is recognized whether the change of the signaling message is due to unsuccessful signaling or due to detecting a fault in the optical path 2. If the control joint flag 32 of the signaling message is X=1, the signaling control unit 22 recognizes that the change has been caused by detecting a fault in the optical path 2. The path management unit 26 may also recognize that the change has been caused by detecting a fault in the optical path 2 when the "inter-layer joint controllability" is set to "controllable" in the path database.

(10) When the signaling message 30 is changed due to the detection of a fault in the optical path 2, and if there are devices between the starting point of the electric path 1 and the device which has detected the fault of the optical path 2, then the alarm suppression of the electric path 1 is not set in the devices. Then, the starting point device 101*a* of the electric path 1 sets the alarm suppression bit 31 of the signaling message 30 to alarm suppression (5*c* in FIG. 13), and transmits the message to the endpoint side device. In addition, the starting point device 101*a* of the electric path 1 sets the alarm suppression of the electric path 1.

When a fault occurs in the optical path 2, and no process is performed, an alarm is also detected in the electric path 1 accommodated in the optical path 2 in which a fault has occurred, and therefore alarms are raised from so many paths. Therefore, it is difficult to identify whether or not the fault occurred in the optical path 2. Conventionally, to suppress an unnecessary alarm that has occurred in the electric path 1, it is checked whether or not a fault is present in each electric path 1, and alarm suppression control is performed on each electric path 1 which has no fault. In the process performed in the embodiments described above, the alarm suppression control on the electric path 1 for which it is desired not to issue an alarm due to a fault in the optical path 2 can be autonomously performed by a device which has detected a fault in the optical path 2. Thus, the load of the operator 3 for suppressing an unnecessary alarm can be reduced, and the number of issues of alarms due to operation errors can be decreased. Furthermore, since an unnecessary alarm is suppressed in the electric path 1, the number of issued alarms can be largely reduced, and the operator 3 can be quickly and easily notified of an occurrence of a fault in the optical path 2.

Figure 14:
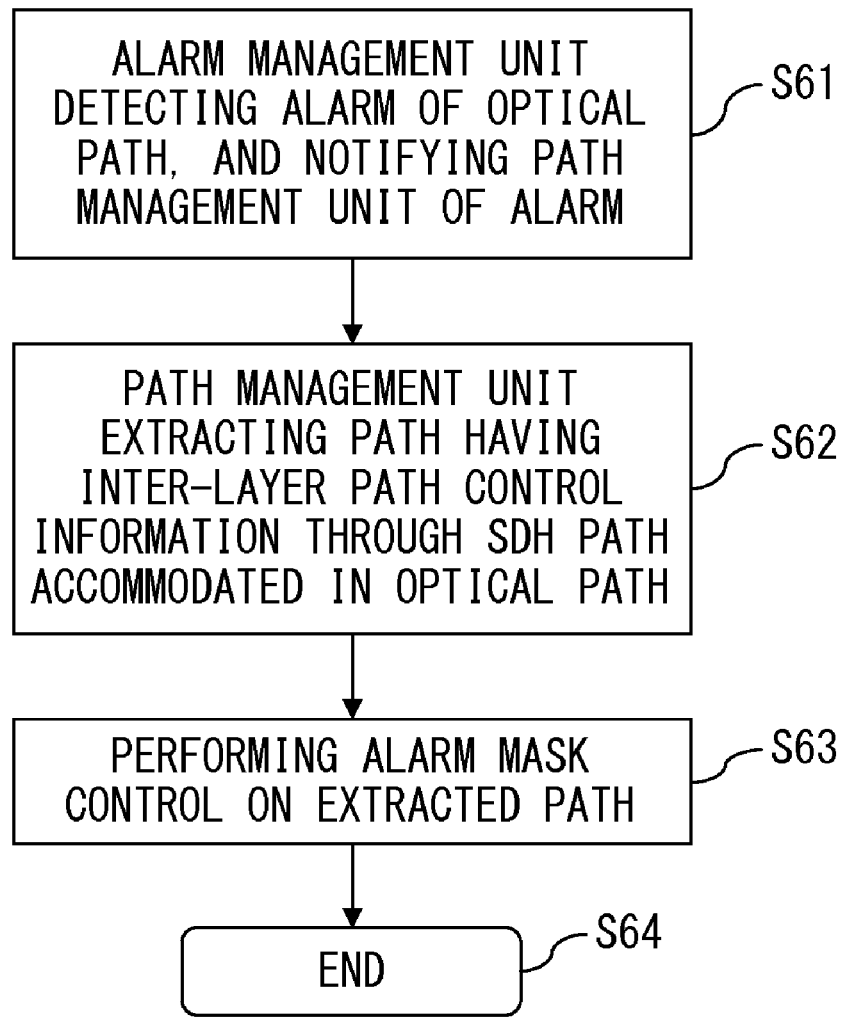
FIG. 14 is a flowchart of a process performed by a cross-connect device when the cross-connect device is triggered by receiving an alarm from another device.

FIG. 14 is a flowchart of the process performed when the cross-connect device receives an alarm from another device. First, the alarm management unit 24 of the device 102a illustrated in FIG. 13 detects the alarm of the optical path 2, and notifies the path management unit 26 of the detection of the alarm (step S61). Upon receipt of the notification, the path management unit 26 extracts the electric path 1 which is accommodated in the optical path 2 and for which it is desired not to issue an alarm although the abnormal condition of the optical path 2 is detected (step S62), and performs the alarm suppression control on the extracted path (step S63). The control on the extracted electric path 1 in step S63 is the same as the control in the procedures (4) and (6) through (10) described above with reference to FIG. 13.

The practical operation of the device which sets the signaling message 30 of the electric path 1 upon detecting a fault of the optical path 2 or receiving an alarm from another device is the same as the operations in steps S21 through S25 described above with reference to FIG. 8. The electric path 1 as a "corresponding path" is extracted by the path management unit 26 as described above.

The details of the operation performed by the device which receives the changed signaling message 30 upon detecting of a fault or receiving an alarm are described above with reference to FIG. 9.

In this example, the case in which alarm suppression is performed due to the detection of a fault or the reception of an alarm is described, but in other control, the electric path 1 can also be controlled due to the detection of a fault etc.

Thus, the cross-connect device 10 extracts the electric path 1 to be controlled when a fault is detected in the optical path 2 or when an alarm is received from another device, and autonomously controls the extracted electric path 1. Therefore, it is not necessary for the operator 3 to control each electric path at an occurrence of a fault of the optical path 2.

<Embodiment Using Notify Message>

In the embodiments described above, the control of the electric path 1 is not performed from the starting point device of the electric path 1. Therefore, the starting point device of the electric path 1 which receives the signaling message 30 from the endpoint side device of the path (a) compares the signaling message 30a transmitted by the starting point device itself with the signaling message 30 received from the endpoint side device, and (b) if the two signaling messages are different from each other, and if the difference is caused by control etc. of the optical path 2, then a signaling message having the same setting as the signaling message 30 received from the endpoint side has to be transmitted to the endpoint side of the path.

Described below in detail is the embodiment of performing control from the starting point device of the electric path 1.

Figure 15:
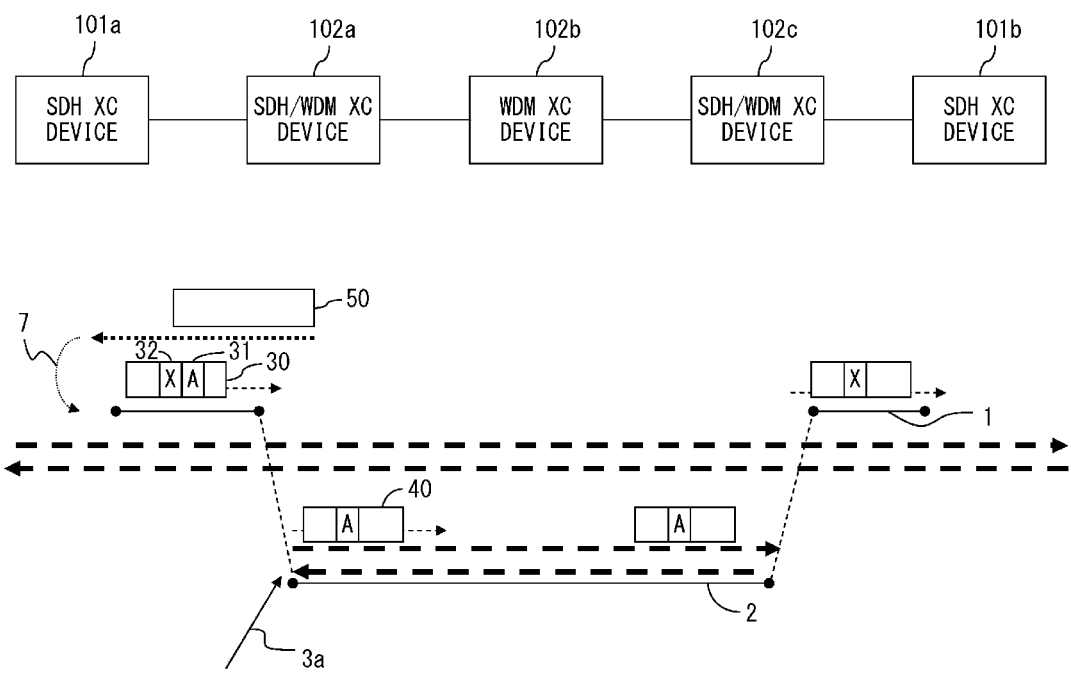
FIG. 15 is an example of an embodiment of control using a path accommodation relationship among layers using a notify message.

FIG. 15 is an example of an embodiment of control performed using a path accommodation relationship among the layers using a notify message. As with the examples above, the electric path 1 is set between the cross-connect devices 101a and 101b, the optical path 2 is set between the cross-connect devices 102a and 102c, and the electric path 1 is accommodated in the optical path 2. The setting in advance for control of the electric path 1 as necessary when the optical path 2 is controlled is the same as the procedure (1) described above with reference to FIG. 2.

(2) The operator 3 performs a setting of optical path alarm suppression on the starting point device 102a of the optical path 2 through the NMS (3a in FIG. 15). The starting point device 102a of the optical path 2 sets the alarm suppression on the optical path 2 operated through the NMS. Each device configuring the optical path 2 is set to alarm suppression of the optical path 2 according to the signaling message 40 of the optical path.

(3) Upon receipt of a control request of the optical path 2, the device 102a extracts the electric path 1 which is accommodated in the controlled optical path 2 and whose control joint flag 32 is set. Furthermore, it transmits a notify message 50 to the starting point device (101a) of the extracted electric path 1.

(4) Upon receipt of the notify message 50, the starting point device (101a) of the electric path 1 sets the electric path 1 to "alarm suppression". Furthermore, it sets the alarm suppression bit 31 of the signaling message 30 to "alarm suppression" (7 in FIG. 15), and transmits the message to the endpoint side of the electric path.

(5) Upon receipt of the signaling message 30 for the electric path 1, the device 102a adjacent to the starting point device 101a of the electric path 1 transmits the signaling message 30 to the endpoint side after setting alarm suppression. The endpoint device 102c of the optical path 2 performs similar operations.

(6) Upon receipt of the signaling message 30, the cross-connect device 101b as an endpoint device of the electric path 1 sets "alarm suppression" on the electric path 1 which has received the signaling message 30, and transmits the signaling message 30 to the starting point side of the electric path 1.

(7) The device such as the device 102a at the intermediate position of the electric path 1 transfers the signaling message 30 received from the endpoint side of the electric path 1 to the starting point side.

(8) The starting point device 101a of the electric path 1 compares the signaling message 30 received from the endpoint side of the electric path 1 with the signaling message 30 transmitted from the device 101a itself. If the messages are identical, it recognizes that the control of the electric path 1 according to the signaling message 30 has been successfully performed.

In the example illustrated in FIG. 15, when the operator 3 issues a control request through the NMS, the control of the electric path 1 is performed using the notify message 50, but similar control can be performed when the device detecting an alarm and a fault.

Figure 16:
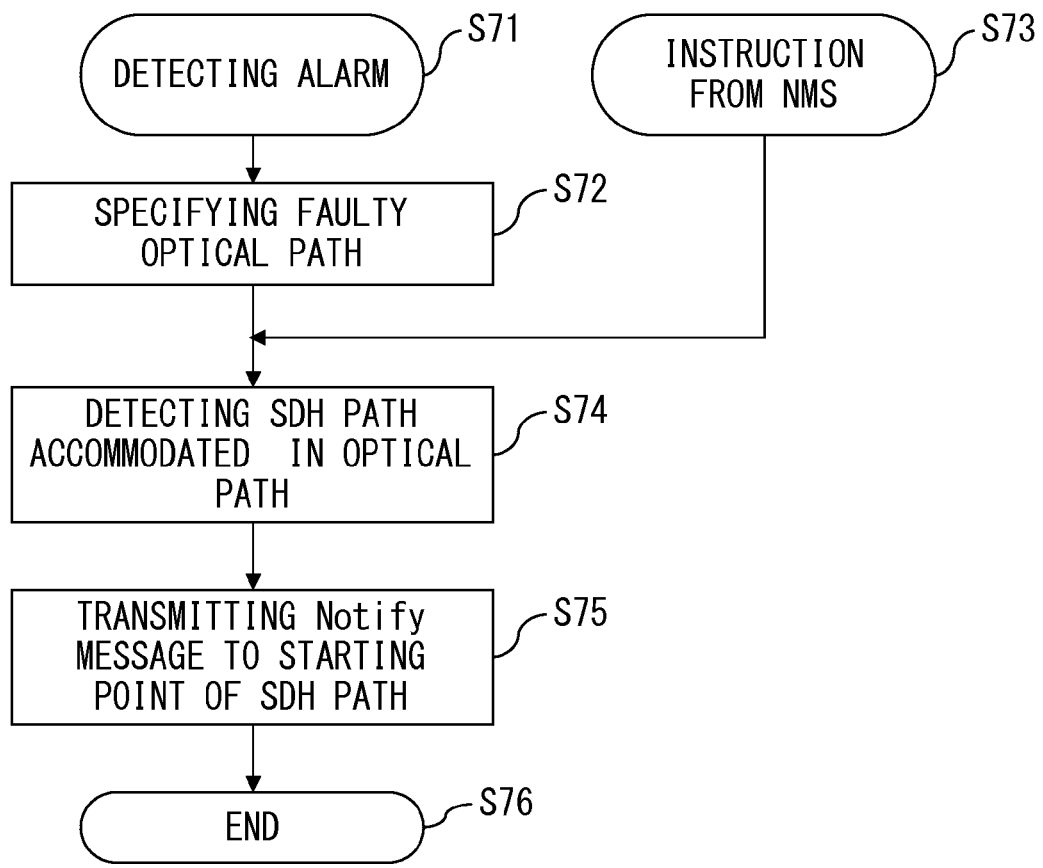
FIG. 16 is a flowchart of the outline of control performed using a notify message.

FIG. 16 is a flowchart of the outline of the control performed using the notify message 50. The alarm management unit 24 of the cross-connect device detects an alarm, and the path management unit 26 determines whether or not the alarm is raised due to a fault of the optical path 2 (steps S71 and S72). When the optical path 2 includes a fault, the path management unit 26 extracts the electric path 1 to be controlled in controlling the optical path 2 from among the electric paths 1 accommodated in the optical path 2 (step S74). At the request from the path management unit 26, the signaling control unit 22 transmits the notify message 50 to the extracted electric path 1 toward the starting point device of the electric path 1 (step S75). If the electric path 1 is controlled in accordance with the control request from the NMS (step S73), the path management unit 26 extracts the electric path 1 to be controlled, and the signaling control unit 22 transmits the notify message 50.

As described above, using a notify message, the cross-connect device can autonomously perform control from the starting point device of the electric path 1 when a state change is made by a control request to the optical path 2, a fault of the optical path 2, etc.

<Method of Controlling Electric Path without State Change of Optical Path>

It can be considered that a control request received by the cross-connect device through the NMS includes only a control request to a lower-level path. For example, when an alarm importance level in a lower-level path is changed, it can be considered that the control request received by the cross-connect device includes only the control request to a lower-level path. In this case, control is not performed on the higher-level path, but the state of the lower-level path is changed. At this time, by using the accommodation relationship among the layers, control can be performed on a plurality of lower-level paths at one control request. That is, by issuing a control request describing the lower-level path to be controlled and the control contents to the device configuring the higher-level path, a lower-level path to be controlled is extracted from among the lower-level paths accommodated in the higher-level path, and all lower-level paths to be controlled are controlled in the device. In the above-mentioned embodiment, a plurality of lower-level paths to be controlled which are conventionally individually controlled can be controlled in one process.

Described below in detail is an embodiment of controlling only the electric path 1 without controlling the optical path 2. The flowchart in FIG. 17 illustrates the path control when the electric path 1 is controlled without controlling the optical path 2.

(1) The device which has received a control request from the NMS transmits a control request to the path management unit 26 (step S81).

(2) When the path management unit 26 determines that the control without controlling the optical path 2 is set as a control item, the electric path 1 which is to be controlled and accommodated in the optical path 2 is extracted by the determination of the path management unit 26 (steps S82 through S83). The path management unit 26 extracts the electric path 1 to be controlled. The method of the path management unit 26 extracting a lower-level path to be controlled is described above with reference to FIG. 6, but the electric path 1 to be controlled is similarly extracted. As described above in the description of the inter-layer joint controllability information 302, when a plurality of electric paths 1 are simultaneously controlled using the accommodation relationship of the optical path 2, the inter-layer joint controllability information 302 is used to extract the electric path 1 to be controlled. The inter-layer joint controllability information 302 is included in the path database as "inter-layer joint controllability" as illustrated in FIG. 6. Then, when the path management unit 26 controls the electric path 1 according to the control request from the NMS, the "inter-layer joint controllability" of the path database is referenced. For the reason that the control joint flag 32 is set to X=1, etc., the electric path 1 specified as "controllable" in the "inter-layer joint controllability" information is extracted as the electric path 1 to be controlled in response to the request from the NMS.

(3) Control is performed on the extracted electric path 1 (step S84).

The control is performed in the same way as described above when it is necessary to control both optical path 2 and electric path 1 (steps S85 through S87). As examples of an embodiment of performing control of the electric path 1 without controlling the optical path 2, the cases in which the alarm importance level of the electric path 1 is changed and a path priority is changed are described below in detail. Described in the example is that the signaling message 30 is changed in the cross-connect device which has received a request when a cross-connect device configuring the optical path 2 receives a control request.

{Embodiment of Setting Alarm Importance Level}

Figure 18:
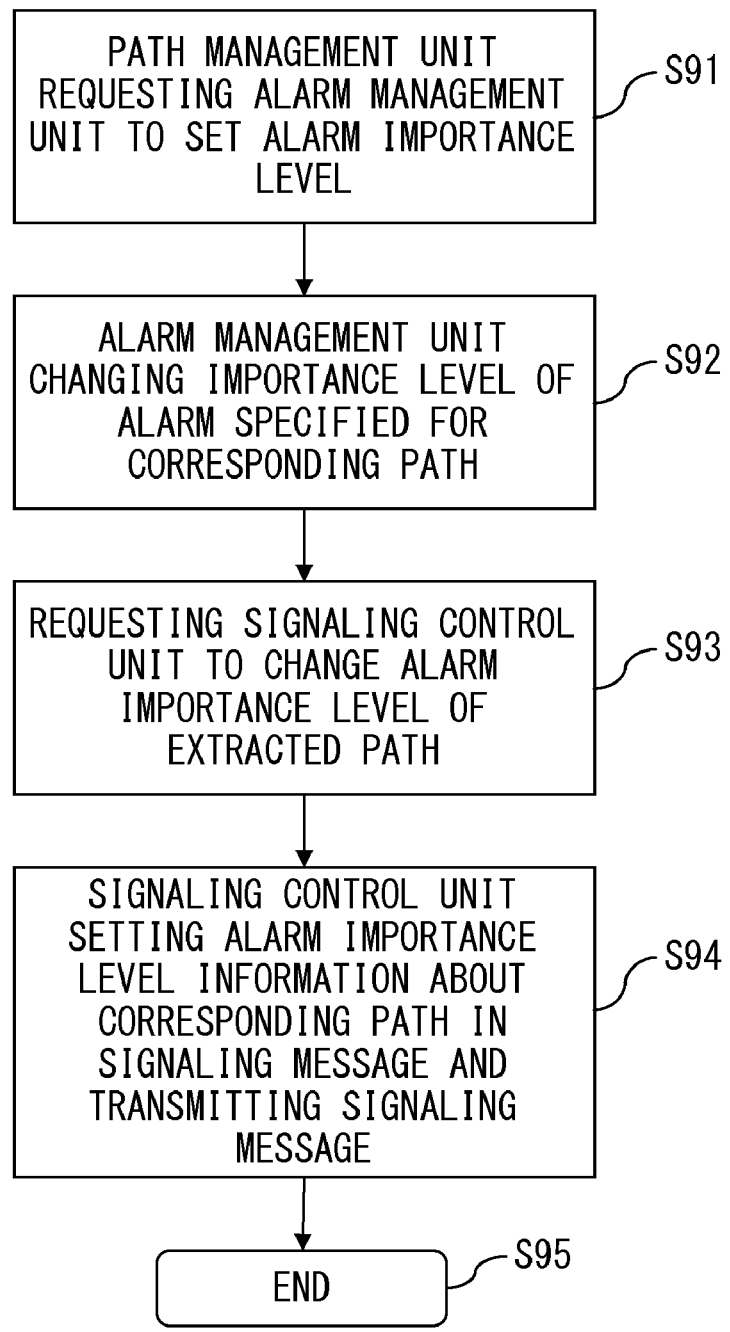
FIG. 18 illustrates an operation of a device for setting a signaling message when an alarm importance level control process is performed.

FIG. 18 illustrates an operation of the device which sets the signaling message 30 when the alarm importance level control process is performed, and the operations performed in step S84 by the device which sets the signaling message 30 are described in detail. The path management unit 26 requests the alarm management unit 24 to set an alarm importance level, and the alarm management unit 24 changes the alarm importance level or the alarm type in response to the request (step S91 through S93). The signaling control unit 22 sets the alarm importance level information about a path in the signaling message and transmits the message (step S94).

FIG. 19 is an example of the signaling message 30 in which the alarm importance level is set. In the signaling message 30, the setting of the alarm importance level "SET_ASA" is set in the control item information 303. The setting information about the type of an alarm to be set and about which the importance level of the alarm is used is included in the control item information 303.

Figure 20:
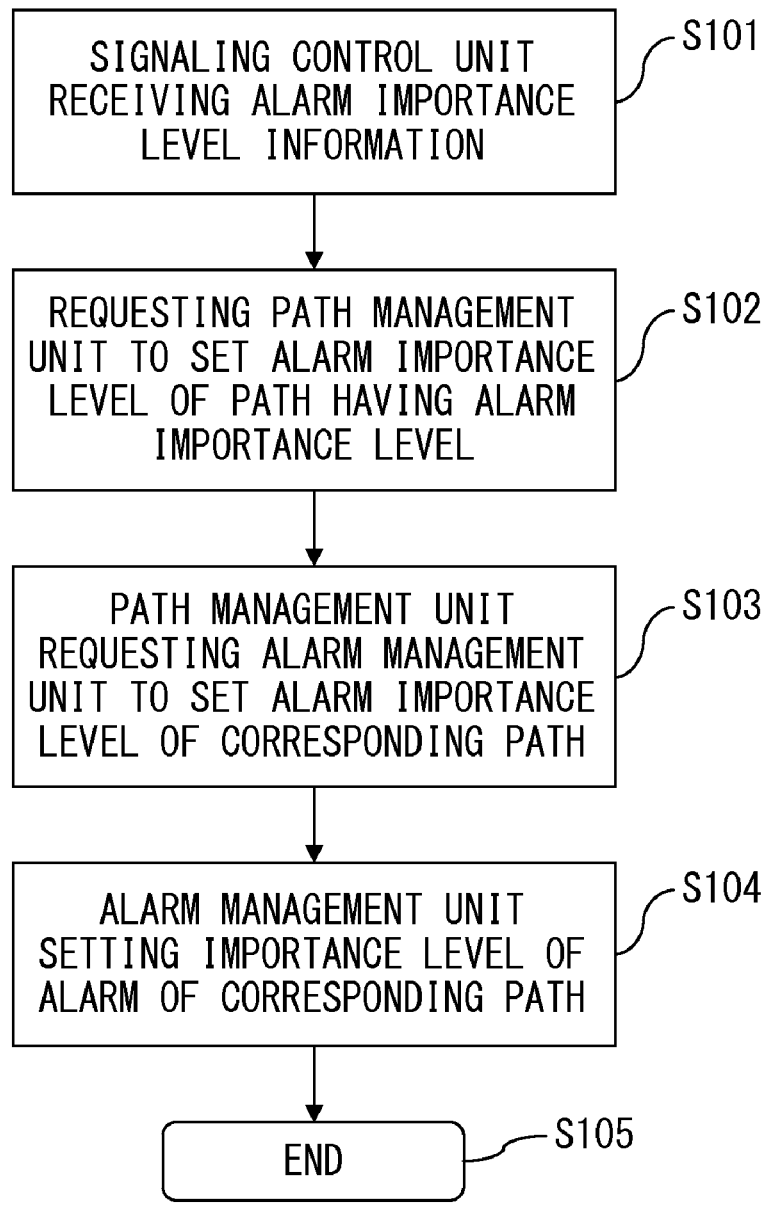
FIG. 20 illustrates an operation of a device when the device receives a signaling message in which alarm importance level information is set.

FIG. 20 illustrates an operation of the device which receives the signaling message 30 in which the alarm importance level information is set. When the signaling control unit 22 receives the alarm importance level information included in the signaling message 30, it requests the path management unit 26 to set an alarm importance level (steps S101 and S102). In response to the request from the path management unit 26, the alarm management unit 24 sets the alarm importance level (steps S101 and S104).

Described below is the method of setting an alarm importance level. FIG. 21 is an example of a path alarm database. The database including a portion related to setting an alarm importance level in the databases in the path management unit 26 is a path alarm database. The data "alarm type" in FIG. 21 records a fault that raises an alarm, and "importance level" refers to the alarm importance level issued when a fault occurs. For example, in the example in FIG. 21, two type of alarms "P-AIS (path-alarm indication signal)" and "LOS (signal loss)" are set in the electric path 1 having the path ID of "1". In addition, plural types of alarms can be set for the same path, and the alarm importance levels for the same path can be the same or different. In the example of the path having the path ID of "1" illustrated in FIG. 21, the importance level of "P-AIS" is set to "WARNING", and the importance level of "LOS" is set to "CRITICAL". In step S84, the alarm management unit 24 makes a change to the information, that is, the alarm type and the importance level, included in the control item information 303 of the signaling message 30. For example, assume that the signaling message 30 having the alarm importance level information illustrated in FIG. 19 about the electric path 1 of the path ID "10" is received by a cross-connect device. In this case, the alarm management unit 24 of the device rewrites the "MINOR" set for "P-AIS" of the electric path 1 having the path ID "10" into "WARNING".

The alarm management unit 24 may have a path alarm database, or the path management unit 26 can control it as a path database, and the alarm management unit 24 may access the path management unit 26 to acquire the information about the alarm importance level.

The setting of an alarm importance level is used when an alarm is not completely masked but monitored at a low level when, for example, a device is transferred due to trouble. In this case, if all electric paths 1 accommodated in the optical path 2 are individually controlled, it is an laborious operation, takes a long time, and has the possibility of incurring an operation error. These problems can be solved by the present embodiment.

{Embodiment of Setting Path Priority}

A path priority may be set by the signaling control unit 22 and the path management unit 26.

First, the operator 3 requests a cross-connect device configuring the optical path 2 to set the priority of accommodated lower-level paths. Upon receipt of the request, the path management unit 26 of the cross-connect device extracts the electric path 1 whose path priority is to be set. The extracting method is described above. Next, a priority level of the electric path 1 which is requested to be set is set. The priority level is set by changing the value of the priority in the path database described in FIG. 6.

Next, upon receipt of the request from the NMS, the signaling control unit 22 of the device generates the signaling message 30 having the structure as illustrated in FIG. 22 and recording the path priority setting and the priority level to be set in the control item information 303. As described above, the generated signaling message 30 is transmitted to the end-point side of the electric path 1, and is similarly processed as in the procedures (3) through (8) illustrated with reference to FIG. 2.

A path priority is set when a path is used as a dedicated line on a priority basis, and when the priority of a standby line is degraded. According to the embodiment, a priority can be set for a plurality of electric paths 1 only by issuing a request to one cross-connect device configuring the optical path 2.

{Embodiment when Other Control is Performed on Electric Path}

An alarm importance level setting and a path priority setting are control items for control only on the electric path 1. However, on other control items, only the electric path 1 can be controlled without controlling the optical path 2.

For example, the alarm masking process for controlling both optical path 2 and electric path 1 in response to the control request to the device configuring the optical path 2 can be set to "alarm masking process A" while the alarm masking process for controlling electric path 1 without controlling the optical path 2 can be differently set to "alarm masking process B". In this case, as described in step S82 (FIG. 17), the path management unit 26 determines depending on the type of control specified by the control item information 303 whether the control target is both optical path 2 and electric path 1 or only the electric path 1. According to the determination result, the processes in steps S83 and S84 are performed if only the electric path 1 is to be controlled, and the processes in steps S85 through S87 are performed if both optical path 2 and electric path 1 are to be controlled.

Thus, if the optical path 2 might be controlled as in the alarm masking process, the specification in the control item information 303 set in the signaling message 30 is changed depending on the presence/absence of the control of the optical path 2, thereby realizing the process of the electric path 1 only.

An example of setting the electric path 1 when a control request for the electric path 1 is issued is described above, but the electric path 1 can also be set when a fault of the optical path 2 occurs. The signaling message 30 for control of the electric path 1 can be changed by the device which receives a control request for the electric path 1, the device which detects a fault of the optical path 2, or the starting point device of the electric path 1 using the notify message 50.

Embodiments according to the invention are not limited to the above-mentioned embodiment, but a number of variations can be made. Some of the variations are described below.

<Embodiment when there is No Inter-Layer Joint Controllability Information in Signaling Message>

In the embodiments described above, the signaling message 30 includes the inter-layer joint controllability information 302, but the inter-layer joint controllability information 302 is not always necessary. When not all the signaling messages 30 of electric path 1 includes the inter-layer joint controllability information 302, all electric paths 1 accommodated in the optical path 2 are controlled.

That is, If it is desired that all electric paths 1 accommodated in the optical path 2 are to be controlled when the optical path 2 is controlled etc., it is not necessary to set the inter-layer joint controllability information 302 in the signaling message 30.

Similarly, when not all the signaling messages 30 of electric paths 1 accommodated in the optical path 2 include the inter-layer joint controllability information 302, all electric paths 1 are controlled when a control request is issued from the NMS to the electric paths 1.

<Path Control Performed when a State Change of Device Occurs>

The cross-connect device configuring the optical path 2 which accommodates the electric paths 1 can control lower-level paths when a specific condition is satisfied. The specific condition may be:

(a) receiving of a control request from an NMS (network management system) etc. by the cross-connect device;

(b) detecting of an abnormal condition of a transmission line etc. in the network by the cross-connect device;

(c) receiving of an alarm about the state of the optical path 2 from another cross-connect device etc.

However, the condition is not limited to the examples above. In addition, a control request received by the cross-connect device from the NMS may include a control request to a higher-level path and/or a control request to a lower-level path. That is, a device which detects a change autonomously controls a path in a different layer.

In the communication device according to some embodiments, the path control unit specifies a lower-level path which is accommodated in a higher-level path and which is a target for the control of the control item, which is the same control item as that indicating the state change in the higher-level path, is to be controlled when the higher-level path or a signaling message of the higher-level path indicates the state change. To specifies the lower-level path which is a target for the control, the path control unit confirms the controllability information indicating "controllable/uncontrollable" when a state change occurs in a higher-level path, and a lower-level path which is set to "controllable" is specified as the target for the control. A signaling message about the specified lower-level path is changed by the signaling control unit, thereby autonomously controlling a plurality of specified lower-level paths by the communication device when the state change occurs in the higher-level path.

According to the path control system using the path accommodation relationship among layers as described above, the number of operation steps can be reduced when a plurality of paths are controlled, and the number of operation errors can also be reduced in a plurality of layers having accommodation relationships.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device configuring a network including a higher-level path which accommodates a lower-level path, comprising:
    a path control unit to specify, by confirming controllability information indicating controllability when the higher-level path or a signaling message setting the higher-level path indicates a state change, a lower-level path accommodated in the higher-level path and set by a signaling message including controllability information indicating "controllable" as a lower-level path to be controlled when the higher-level path or a signaling message of the higher-level path indicates a state change;
    a signaling control unit to set, with respect to a control item corresponding to the state change, path control information to a signaling message used in the lower-level path to be controlled which has been specified by the path control unit; and
    a control item control unit to control the control item.

2. The communication device according to claim 1, wherein when the state change occurs in the higher-level path, the signaling control unit sets the path control information in the signaling message used in the lower-level path to be controlled.

3. The communication device according to claim 1, wherein the state change of the higher-level path is a state change by control of the higher-level path performed due to a control request received by a device configuring the higher-level path, or a state change made by a fault occurred in the network.

4. The communication device according to claim 1, wherein when the state change is detected, the signaling control unit changes the signaling message used in the lower-level path to be controlled such that the controllability information about a control item controlled on the higher-level path is set to controllable.

5. The communication device according to claim 1, wherein the path control unit specifies the lower-level path to be controlled with reference to a database storing information about an accommodation relationship between the higher-level path and the lower-level path for each lower-level path, and about whether or not the lower-level path is to be controlled when the higher-level path indicates the state change.

6. The communication device according to claim 1, wherein:
    the control item control unit comprises an alarm suppression control unit to control path alarm; and the alarm suppression control unit suppresses a path alarm when the control item indicates pass alarm suppression.

7. The communication device according to claim 1, wherein:
    the control item control unit comprises a performance control unit to control a path performance; and the performance control unit resets performance monitor information when the control item indicates a performance monitor reset.

8. A communication device configuring a network including a higher-level path which accommodates a lower-level path, comprising:
    a path control unit to specify, by confirming controllability information indicating whether or not the communication device, which has received a control request for one lower-level path included in a signaling message setting the lower-level path, controls the one lower-level path, a lower-level path accommodated in the higher-level path and set by a signaling message including controllability information indicating "controllable" as a lower-level path to be controlled by a same type of control as the one lower-level path;
    a signaling control unit to set, with respect to a control item performed for the lower-level path to be controlled, path control information to a signaling message used in the lower-level path to be controlled which has been specified by the path control unit; and
    a control item control unit to control the control item.

9. The communication device according to claim 1, wherein:
    the signaling control unit transmits a notify message for changing a signaling message to a starting point device of the lower-level path to be controlled; and upon receipt of a signaling message updated by the starting point device according to the notify message, the control item control unit controls the lower-level path to be controlled.

10. The communication device according to claim 8, wherein:
    the control item control unit comprises an alarm importance level control unit to control a path alarm importance level; and the alarm importance level control unit changes an alarm type and/or an alarm importance level when the control item indicates an alarm importance level change.

11. The communication device according to claim 8, wherein when the control item indicates a path priority change, the path control unit changes a path priority and a priority level.

* * * * *